(12) United States Patent
Gilbert et al.

(10) Patent No.: US 11,854,286 B2
(45) Date of Patent: *Dec. 26, 2023

(54) IMAGE-BASED DOCUMENT ANALYSIS USING NEURAL NETWORKS

(71) Applicant: JPMORGAN CHASE BANK, N.A., New York, NY (US)

(72) Inventors: Steven Gilbert, New York, NY (US); Mugundhan Elamathi, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 95 days.

This patent is subject to a terminal disclaimer.

(21) Appl. No.: 17/933,795

(22) Filed: Sep. 20, 2022

(65) Prior Publication Data

US 2023/0011841 A1 Jan. 12, 2023

Related U.S. Application Data

(63) Continuation of application No. 16/867,441, filed on May 5, 2020, now Pat. No. 11,568,663.

(51) Int. Cl.
| | | |
|---|---|---|
| *G06V 30/413* | (2022.01) | |
| *G06F 16/93* | (2019.01) | |
| *G06F 16/54* | (2019.01) | |
| *G06F 16/11* | (2019.01) | |
| *G06N 3/08* | (2023.01) | |
| *G06Q 10/10* | (2023.01) | |

(52) U.S. Cl.
CPC .......... *G06V 30/413* (2022.01); *G06F 16/116* (2019.01); *G06F 16/54* (2019.01); *G06F 16/93* (2019.01); *G06N 3/08* (2013.01); *G06Q 10/10* (2013.01)

(58) Field of Classification Search
CPC .................................................. G06V 30/413
USPC ........................................................ 382/224
See application file for complete search history.

(56) References Cited

U.S. PATENT DOCUMENTS

| | | | | |
|---|---|---|---|---|
| 7,392,245 | B1 * | 6/2008 | Finlay | G06F 16/24524 |
| 7,665,027 | B1 * | 2/2010 | Scalora | G06Q 40/02 |
| | | | | 715/764 |
| 9,396,177 | B1 * | 7/2016 | Kursun | G06F 40/20 |
| 9,424,333 | B1 * | 8/2016 | Bisignani | G06F 16/248 |
| 10,719,667 | B1 * | 7/2020 | Roy | G06F 40/40 |

(Continued)

FOREIGN PATENT DOCUMENTS

CN 107943872 4/2018

OTHER PUBLICATIONS

International Search Report and Written Opinion of the International Searching Authority, dated Jul. 28, 2021, from corresponding International Application No. PCT/US2021/030828.

*Primary Examiner* — Reza Nabi
(74) *Attorney, Agent, or Firm* — GREENBERG TRAURIG LLP

(57) ABSTRACT

Systems and methods for receiving a set of documents (e.g., financial documents) converting them into graphical images, performing image-based, artificial intelligence analysis to determine a score for the set of documents. In addition, the artificial intelligence system generates an image output that indicates how the artificial intelligence system arrived at the score be visually depicting the graphical features detected by the artificial intelligence system. This may allow insight as to the basis for the score.

21 Claims, 5 Drawing Sheets

(56) References Cited

U.S. PATENT DOCUMENTS

| | | | | |
|---|---|---|---|---|
| 11,270,375 | B1* | 3/2022 | Jennings | G06Q 40/125 |
| 11,301,502 | B1* | 4/2022 | Dijamco | G06F 40/35 |
| 2006/0288284 | A1* | 12/2006 | Peters | G06F 16/904 |
| | | | | 715/700 |
| 2009/0070094 | A1* | 3/2009 | Best | G06F 40/103 |
| | | | | 704/2 |
| 2009/0201294 | A1* | 8/2009 | Hayes | G06Q 40/00 |
| | | | | 705/30 |
| 2011/0270851 | A1* | 11/2011 | Mishina | G06F 16/90339 |
| | | | | 707/E17.058 |
| 2012/0203598 | A1* | 8/2012 | Patterson | G06Q 10/0639 |
| | | | | 705/7.42 |
| 2013/0013287 | A1* | 1/2013 | Takayama | G06F 8/34 |
| | | | | 704/4 |
| 2013/0013379 | A1* | 1/2013 | Carter | G06Q 10/06 |
| | | | | 705/7.39 |
| 2014/0184607 | A1* | 7/2014 | Toyoshima | G06T 11/206 |
| | | | | 345/440 |
| 2017/0192962 | A1* | 7/2017 | Gou | G06F 40/205 |
| 2020/0401662 | A1* | 12/2020 | Chen | G06F 40/30 |
| 2021/0174025 | A1* | 6/2021 | Hu | G06F 40/289 |
| 2022/0138407 | A1* | 5/2022 | Salazar | G06F 16/9024 |
| | | | | 715/204 |
| 2022/0171936 | A1* | 6/2022 | Wang | G06N 3/04 |

* cited by examiner

IMAGE-BASED DOCUMENT ANALYSIS USING NEURAL NETWORKS

This application is a Continuation of U.S. patent application Ser. No. 16/867,441, filed May 5, 2020, now U.S. Pat. No. 11,568,663, which claims the disclosure of which is hereby incorporated by reference in its entirety.

BACKGROUND OF THE INVENTION

1. Field of the Invention

Embodiments relate to systems and methods for analyzing documents (e.g., financial statements) using artificial intelligence and providing an output relating to how the documents were analyzed.

2. Description of the Related Art

To determine the financial health of a business entity, individuals typically analyze various financial documents related to the business entity. These financial documents may be a balance sheet, an income statement, a cash flow statement, and other related documents. A balance sheet may describe the business entity's assets, liabilities, and capital. It may show the value (e.g., in terms of dollar amounts or other currency) of each of these components of a business entity. An income statement may include information describing the profit or loss of the business entity over time. For example, an income statement may show a business entity's revenue translates into a net profit or loss for a particular duration of time. A cash flow statement may show different sources of income (e.g., sales, investments, royalties, rent, etc.) and the values of such income over a particular duration of time.

Advancements in software automation allow for an efficient analysis of data to provide analytics and drive decision-making. However, in many cases, it is not appropriate to use automated software tools to provide analytics because such tools do not provide insight as to how the data analytics are generated. For example, regulations, statutes, or other legal reasons may require an explanation as to how the financial health of a business entity is determined. Thus, merely relying on a software tool that automates this process is inadequate because it may not explain how a result is determined. In other words, from a technological standpoint, there is a technological gap in providing insight as to how automated software tools provide analytical results.

SUMMARY OF THE INVENTION

The present disclosure relates to using artificial intelligence to analyze documents to generate an indication of an entity's financial health. The present disclosure improves the technological field by modifying the artificial intelligence process to create an output image that indicates or otherwise explains how an artificial intelligence algorithm arrived at a particular output. This output image may be used to gain insight for explaining the reasoning behind the output result.

An artificial intelligence algorithm may include a trained machine learning module. In this embodiment, the trained machine learning module may be constructed of several interconnected neural network layers that apply training weights or filters to analyze an input. Training data sets configure the training weights of filters of different neural network layers. An input is provided and an output is generated, where the output represents a classification or other analytic result of the input, depending on how the machine learning module was trained. This process may appear as a "black box" that does not reveal how the output was determined.

The present disclosure describes embodiments of generating an output image having "hot spots" of input data that shows aspects of the input data that strongly influenced the outcome of the machine learning module. Because documents may originally be formatted as text files, documents are converted into graphical charts. These graphical charts are inputted into a trained machine learning module. The trained machine learning module outputs a score indicative of the financial health of the entity associated with the inputted documents. In this respect, the trained machine learning module performs an analysis on image data, searching for graphical features within the image. An output image may be generated along with the score. The output image may show hotspots that appear as being overlaid one or more of the graphical charts. These hotspots allow a user to quickly see what graphical features of the charts were given relatively more weight in determining the score. A user may easily view the output image to see portions in the graphical charts that led to a particular score. This provides documentation, rationale, and justification, for explaining why a particular score is applied to an entity. Accordingly, this modification to artificial intelligence algorithms allows individuals to automate the analysis of documents while gaining insight as to how that analysis is performed.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
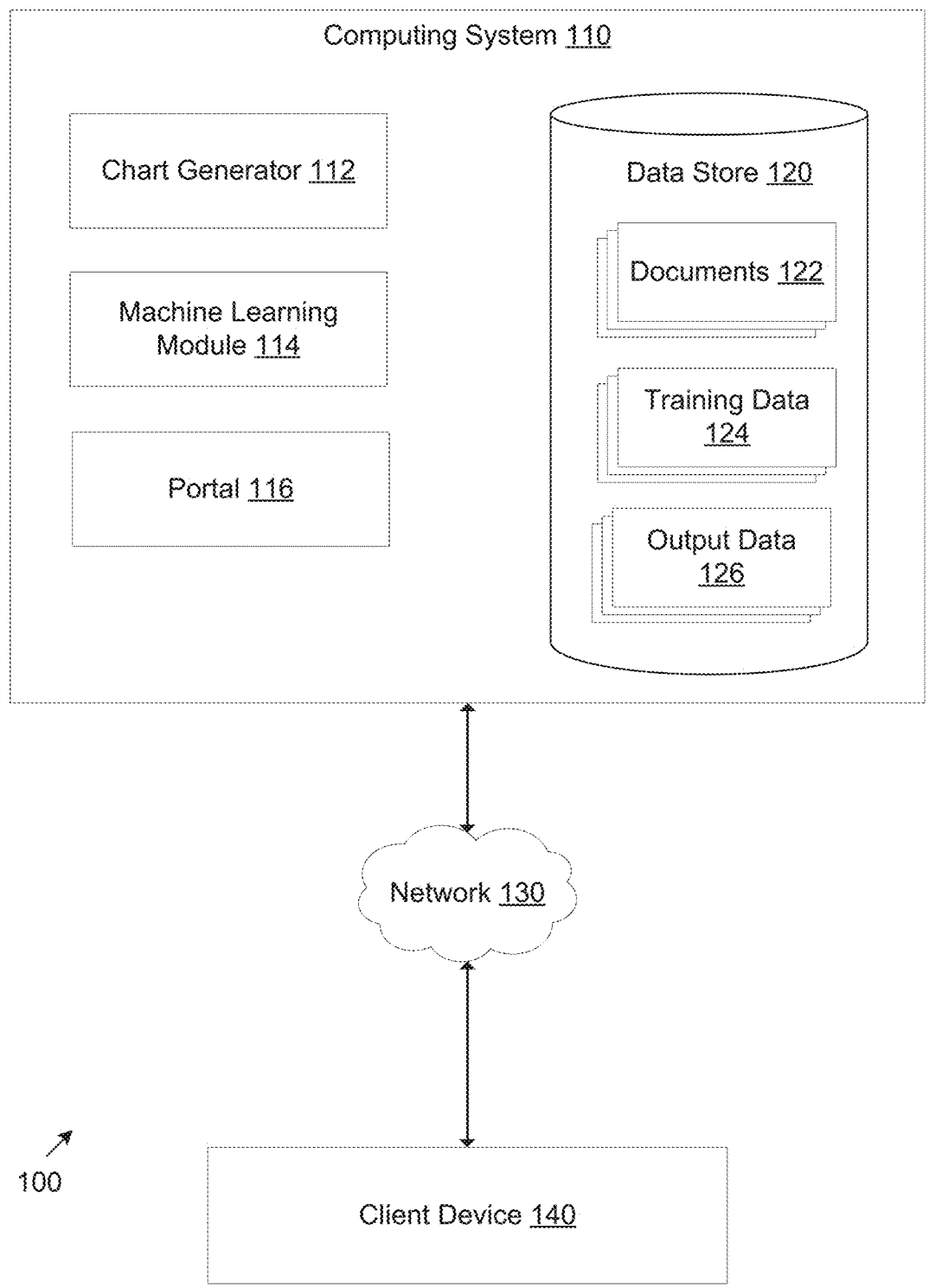
FIG. 1 is a drawing of a networked environment 100 according to various embodiments.

FIG. 1 shows a networked environment 100 according to various embodiments. The networked environment 100 includes a computing system 110 that may execute application programs such as, for example, a chart generator 112, a machine learning module 114, and a portal 116.

The computing system 110 may be implemented as a server installation or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource and/or any other distributed computing arrangement. In some embodiments, the computing system 110 may correspond to an elastic computing resource where the allotted capacity of processing, network, storage, or other computing-related resources may vary over time. The computing system 110 may implement one or more virtual machines that use the resources of the computing system 110 to execute server-side applications.

The computing system 110 may include a data store 120. The data store 120 may store data, files, executable code, libraries, application programming interfaces (APIs), and other data/executables to allow the application programs of the computing system 110 to execute. For example, the application programs of the computing system 110 may read data from the data store, write data to the data store 120, update, delete, or otherwise manipulate data in the data store 120.

The data store 120 may store documents 122, training data 124, and output data 126. Documents 122 may include financial documents of an entity. Financial documents include, for example, a balance sheet, an income statement, a cash flow statement, and other related documents. The documents 122 may be organized by an entity identifier to associate different sets of documents 122 to different entities. For example, an entity named "ABC, Inc." may have an entity identifier that associates its documents 122 to ABC, Inc. while an entity named "XYZ, Inc." may have a different identifier that associates its own documents 122 to XYZ, Inc.

Documents are formatted in one or more text file formats. Text file formats include word processing formats, spread sheet formats, portable document formats, or other formats that describe information using alphanumeric symbols (e.g., American Standard Code for Information Interchange (ASCII)). The documents 122 serve as inputs during runtime of software applications executed in the computing system 110.

Training data 124 may include a dataset for training a machine learning module. The training data 124 may include documents similar to the documents 122 stored in the data store, but also include labels as to how the documents of the training data 124 should be scored. The machine learning module 114 is configured using the training data 124 during configuration time.

The output data 126 includes the results of the machine learning module 114. For a given input set, the corresponding output data 126 may include a result (e.g., a score) and an image output that shows graphically, the portions of the input set that influenced the score.

The chart generator 112 may be a module or component that receives a set of documents 122 and converts them into a corresponding set of graphical images. For example, the chart generator 112 may generate graphical charts based on the input set of documents. If a document 122 is an income statement, the chart generator 112 may generate a graphical income statement chart that graphically represents the content of the input income statement. The graphical image may be formatted in a graphical file format. A graphical file format may be in a bitmap, vector, or other graphical format. In this respect, the content of the graphical image is represented as image data as opposed to text characters.

In some embodiments, the chart generator 112 converts input documents 122 into Sankey charts having a graphical file format. A Sankey chart provides depth, color, and other visual characteristics to represent textual data (e.g., financial information).

The computing system 110 includes an artificial intelligence algorithm such as, for example, a machine learning module 114. The machine learning module 114 is trained using the training data. In some embodiments, the machine learning module 114 includes a neural network. A neural network may include several layers. The neural network may include convolutional layers, Rectified Non-Linear unit (ReLU) layers, pooling layers, a fully connected layer, or potentially other layers. A particular convolutional layer may include an independent set of filters that "convolve" or slide across the input to the convolutional layer. This allows a visual "feature" to be detected within the input to the convolutional layer, where the feature is defined as a corresponding filter. The training data 124 is used to generate the filter values, thereby, defining what features to search for in the input to a given convolutional layer. In addition, the input to convolutional layer may be a bit map image, where the filter convolves across blocks of pixels in the image.

In some embodiments, the input to the neural network comprises a set of graphical images. The set of graphical images may include three images: a Sankey chart for an income statement, a Sankey chart for a balance sheet, and a Sankey chart for a cash flow statement. In this embodiment, the neural network may include a first set of convolutional layers trained to analyze Sankey charts for income statements, a second set of convolutional layers trained to analyze Sankey charts for balance sheets, and a third set of convolutional layers trained to analyze Sankey charts for cash flow statements. Moreover, the training data 124 in this embodiment includes a dataset made up of income statements, balance sheets, and cash flow statements along with corresponding score labels.

Each type of image input corresponds to a respective set of convolutional layers within the neural network, where each set of convolutional layers is trained. In this respect, each convolutional layer is configured according to training data 124 made up of different documents.

The neural network may also include a ReLu layer in between convolutional layers. The ReLu layer may use an activation function to transform summed weighted inputs of an adjacent layer and output them to another adjacent layer. The neural network may also include a pooling layer that reduces the spatial size of inputs between adjacent layers in the neural network. This provides more detailed feature recognition as inputs move through the neural network. The neural network may also include a fully connected layer that is positioned as an end layer of the neural network to generate a final output.

The computing system 110 also includes a portal 116 that makes the output data 126 accessible over a network 130 to client devices 140. The network 130 may include networks such as the Internet, intranets, extranets, wide area networks (WANs), local area networks (LANs), wired networks, wireless networks, or other suitable networks, etc., or any combination of two or more such networks. The client device 140 may include a personal computing device, laptop, mobile device, smart phone, tablet, desktop, or other device. The client device 140 may include a client application such as a browser or dedicated mobile application to communicate with the portal 116. The portal 116 may receive requests from the client device 140 and generate responses using a communication protocol such as, for example, Hyper Text Transport Protocol (HTTP). The portal 116 may receive output data 126 generated by the machine learning module 114 and make it available to users via the portal.

The various components in the networked environment 100 work together to carry out the operations of embodiments described herein. There are generally two modes that take place in the networked environment 100: training mode and runtime mode. Training mode refers to the generation of training data 124 and the configuration of the machine learning module 114. Runtime mode refers to the analysis of documents 122 and the generation of output data 126 relating to the analysis. Both training mode and runtime mode may occur at the same time or in serial. For example, as output data 126 is generated, the output data 126 may be evaluated for accuracy and then stored as training data 124.

In training mode, training data 124 is generated by labeling datasets. For example, a user may review a set of documents 122 of a particular entity and assign the set of documents a score. The assignment of a score is a label for the set of documents. This process can be repeated for several sets of documents to generate the training data 124. To train the machine learning module 114, the training data 124 (e.g., labeled dataset) is converted into graphical images using the chart generator 112, and then provided to the machine learning module 114 to train it. The machine learning module 114 configures filter values based on the training data 124.

The larger the dataset of the training data and/or the better the quality of the training data, the better the accuracy of the machine learning module 114.

Figure 2:
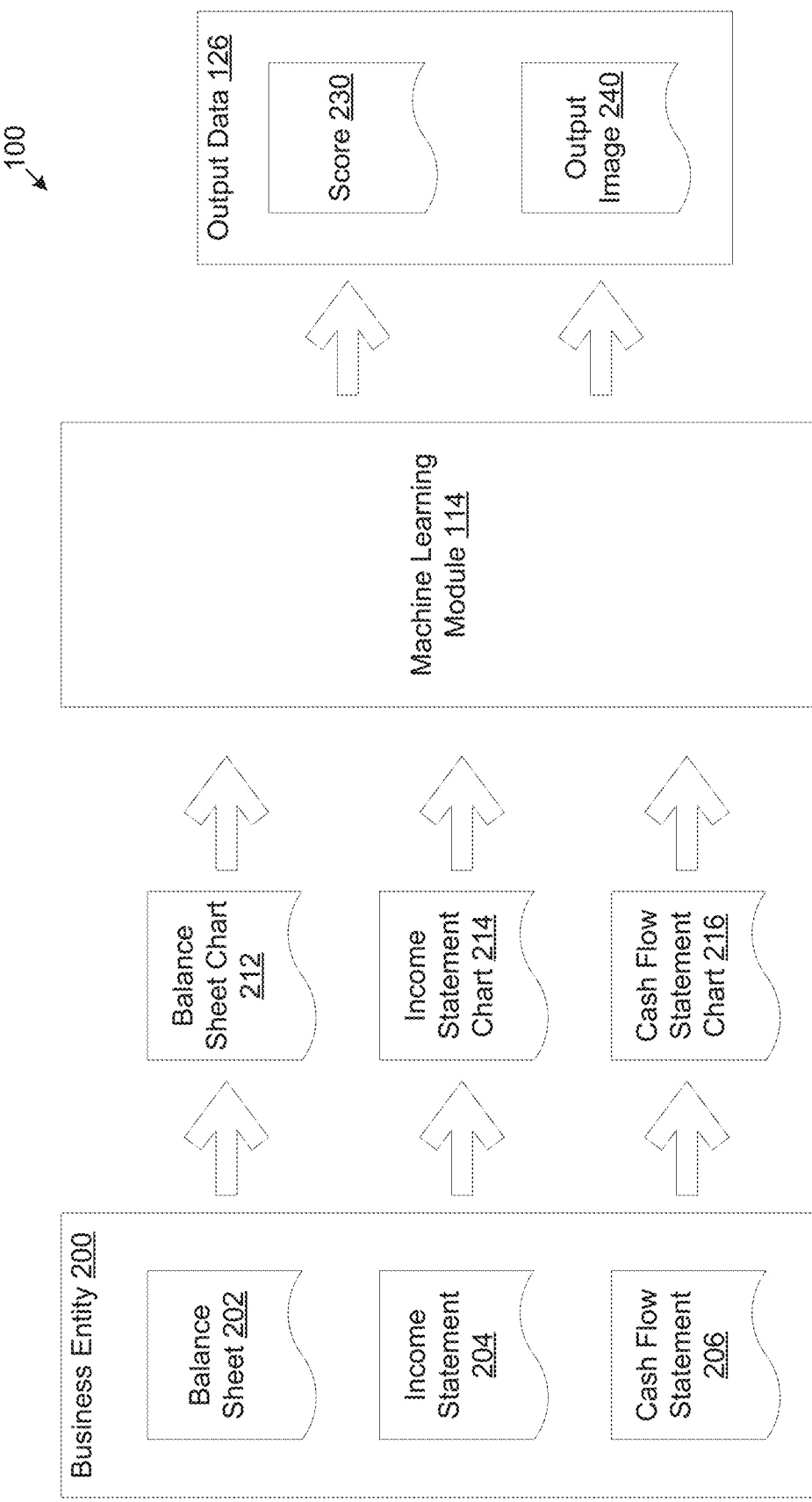
FIG. 2 is a diagram showing operations within a networked environment during runtime mode according to various embodiments.

FIG. 2 is a diagram showing operations within a networked environment 100 during runtime mode according to various embodiments. Specifically, FIG. 2 shows an example of analyzing the financial health of an entity 200, which may be a business. The financial health may be quantified as a score that translates into a rating. The rating indicates the financial health of the entity to allow business decisions to be made. By knowing the financial health, lenders may choose to offer loan products.

To perform this analysis, a set of documents 122 are stored for the entity. This set of documents 122 may correspond to an entity identifier. In this embodiment, the set of documents 122 for a particular entity includes a balance sheet 202, an income statement 204, and a cash flow statement 206, each of which are specific to the entity.

The computing system converts the set of documents 122 to a set of corresponding graphical images using, for example, a chart generator 112. For example, the chart generator 112 converts the balance sheet 202 into a balance sheet chart 212, converts the income statement 204 into an income statement chart 214, and converts the cash flow statement 206 into a cash flow chart 216. The balance sheet chart 212, income statement chart 214, and cash flow chart 216 may be formatted in a graphical format (e.g., an image file) and subject to analysis by a machine learning module 114 that performs image analysis.

In the example of FIG. 2, the machine learning module 114 has been trained according to training data 224. The training data 124 may be made up of several labeled sets of documents. The machine learning module 114 receives the balance sheet chart 212, income statement chart 214, and cash flow chart 216 as an input dataset. After performing convolutional, pooling, and other operations, the machine learning module 114 generates output data 126. The output data 126 includes a first output being a score 230 and a second output being an output image 240. The score 230 may be generated as the output of a fully connected layer of the neural network. The score may be a numeric score that is assigned to the documents 122 of the entity 200. The score represents the financial health of the entity and is calculated by the machine learning module 114 that was trained to calculate scores using the training data 124.

The output data 126 also includes an output image 240. Unlike the score 230, the output image 240 is a graphical file generated at an output of one of the layers of the neural network. The output image 240 may be a processed version of at least one of the balance sheet chart 212, income statement chart 214, or cash flow chart 216. The processing is performed by the machine learning module 114 as it performs convolutional operations on different blocks of pixels of one or more of these charts 212, 214, 216. This shown in more detail with respect to FIG. 3.

Figure 3:
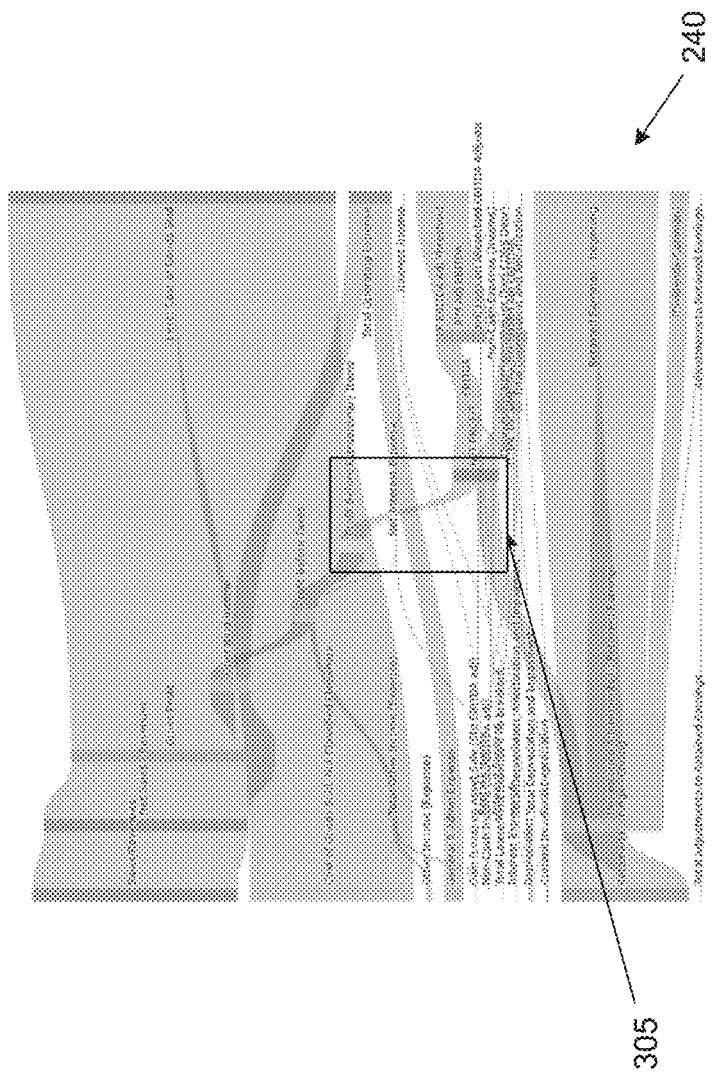
FIG. 3 is a drawing showing an output image generating in a network environment according to various embodiments.

FIG. 3 is a drawing showing an output image generating in a network environment according to various embodiments. The output image may be the output image 240 of FIG. 2. The output image 240 represents a processed version of graphical image (e.g., balance sheet chart 212, income statement chart 214, cash flow chart 216). The output image 240 includes a region 305. The region 305 contains visual artifacts that are generated by modifying a visual characteristic of a region of the graphical image. The visual characterization may be a color intensity or sharpness. For example, the content within the region 305 is generated by adjusting a visual characteristic of a specific region of the underlying graphical image. This may involve increasing the color intensity or sharpness of the content within the region 305.

As the machine learning module 114 processes the graphical image at different neural network layers, the graphical image is being modified. For example, different filters convolve across the graphical image to detect features. A feature may be an edge, vertical line, horizontal line, interior boundary, exterior boundary, etc. Feature detection may involve analysis through multiple convolutional layers. For example, an initial convolutional layer may provide course feature detection. After pooling the locations of course features, subsequent convolutional layers may provide finer, more detailed, feature detection of course features. Ultimately, a feature is detected in the graphical image input, where the detected feature is used, at least in part, to determine the score 230 assigned to the graphical inputs. The output image 240 shows the location of detected features as region 305 overlaid on one or more graphical image inputs.

As shown in FIG. 3, the region 305 may be a hotspot indicating the location of a detected feature. The feature may represent an outlier of a metric represented in the set of documents. The metric may be a cash flow amount, a volume amount, a profit, a gross sale amount, a value relating to a relationship of assets to liabilities, a net worth amount, a liquidity amount, or other financial metric that forms the basis for that score 230 assigned to the set of documents. For example, the training data 124 configures the machine learning module 114 to make determinations for scores 230 based on particular financial metrics or combination of financial metrics. As the machine learning module 114 processes the set of graphical images that express these financial metrics, visual features of these financial metrics are identified by the machine learning module 114. The output image 240 captures these visual features as one or more hotspots within one or more regions 305.

The output image 240 may be generated by directly accessing an output of a convolutional layer within the neural network so as to reveal how the convolutional layer scanned for features.

Figure 4:
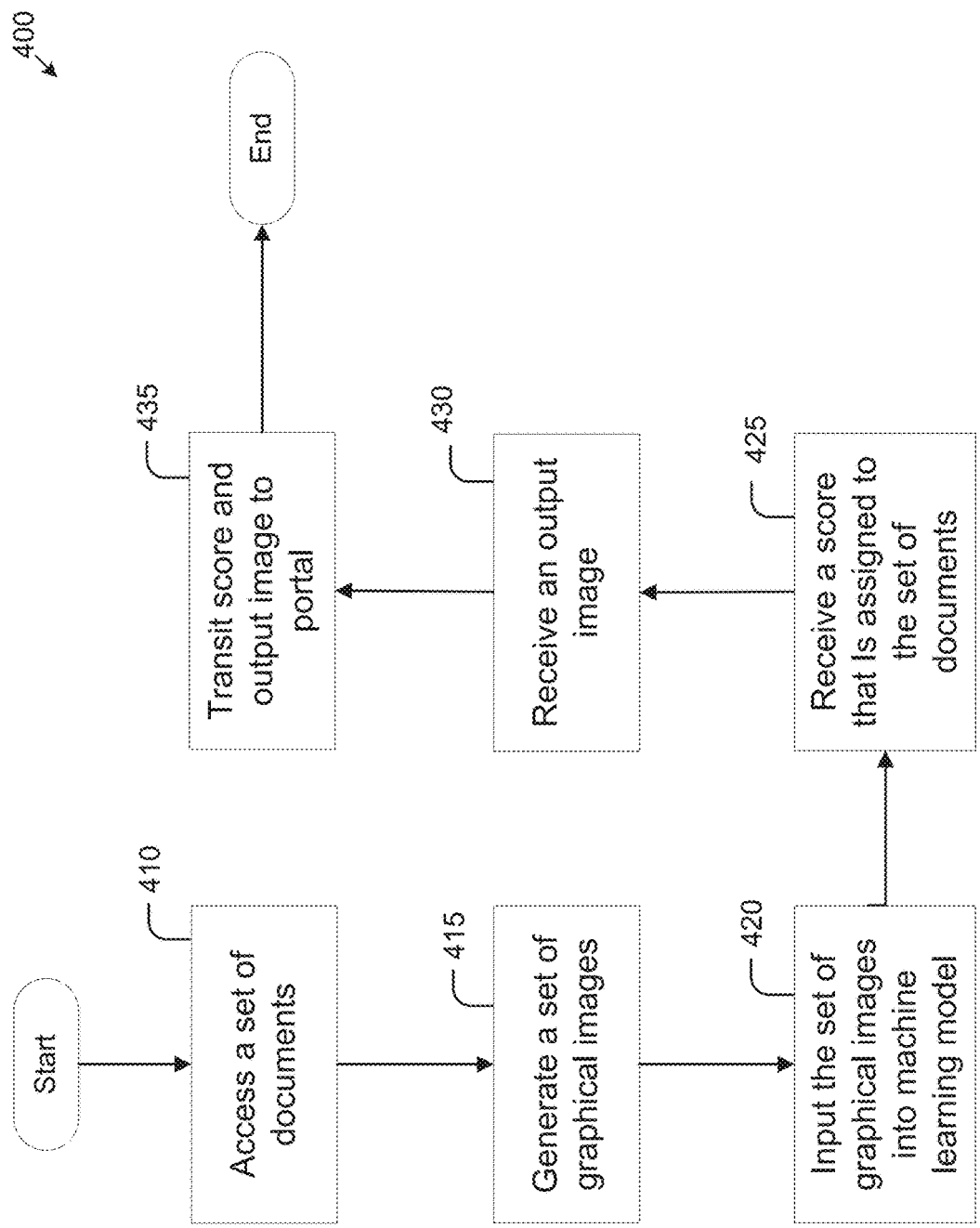
FIG. 4 is a flowchart illustrating an example of the functionality to generate outputs in a networked environment according to various embodiments.

FIG. 4 illustrates an example of the functionality to generate outputs in a networked environment according to various embodiments. It is understood that the flowchart of FIG. 4 provides an illustrative example of the many different types of functional arrangements that may be employed to implement the operation of the portion of a computing system as described herein. The flowchart of FIG. 4 may also be viewed as depicting an example of a method 400 implemented in the networked environment 100 of FIG. 1 according to one or more embodiments. FIG. 4 further represents an operation during runtime of a machine learning module.

At item 410, the computing system may access a set of documents. The set of documents may pertain to a particular entity identifier of an entity. For example, the set of documents may be financial documents of a business, where those financial documents are formatted in a text file format (as opposed to being graphical images).

At item 415, the computing system may generate a set of graphical images. For example, each document in the set of documents is converted into a corresponding graphical image. The graphical image may be a Sankey chart formatted in a graphical file format. A chart generator may be used as a module that converts text documents into graphical image charts. One benefit may be that the conversion into graphical image charts provides a degree of standardization across all types of business entities. For example, the process may be agnostic to the size of the business, the industry of the business, or other aspects of the business. Thus, regardless of the nature of the business entity, the set of documents are handled in the same manner. This allows sets of documents to be treated the same.

At item 420, the computing system may input the set of graphical images into an artificial intelligence algorithm including, for example, a neural network or other machine learning module. The artificial intelligence algorithm may be trained according to training data.

While the artificial intelligence algorithm operates on the set of graphical image inputs, it is indirectly operating on the original set of documents having content that is graphically represented in the graphical image inputs.

At item 425, the computing system may receive a score that is assigned to the set of documents. The score may be assigned to the set of documents such that the score quantifies the set of documents based on the way the artificial intelligence algorithm was trained. For example, the training data may train the artificial intelligence algorithm to assign high scores to inputs indicating large profits over time, consistent cash flow over time, and a large asset to liability ratio. The score may represent the financial health of an entity based on the set of documents.

At item 430, the computing system may receive an output image. The output image may be similar to the output image shown in FIG. 3. The output image may be obtained by accessing a layer in the convolutional layer of the artificial intelligence algorithm. The output image visually depicts one or more features detected by the artificial intelligence algorithm as it determined the score to be assigned to the set of documents. The features may be presented as a hotspot within a region showing the detected feature.

At item 435, the computing system may transit the score and output image to a portal. The portal may provide access to the score and output image to client devices over a network.

Figure 5:
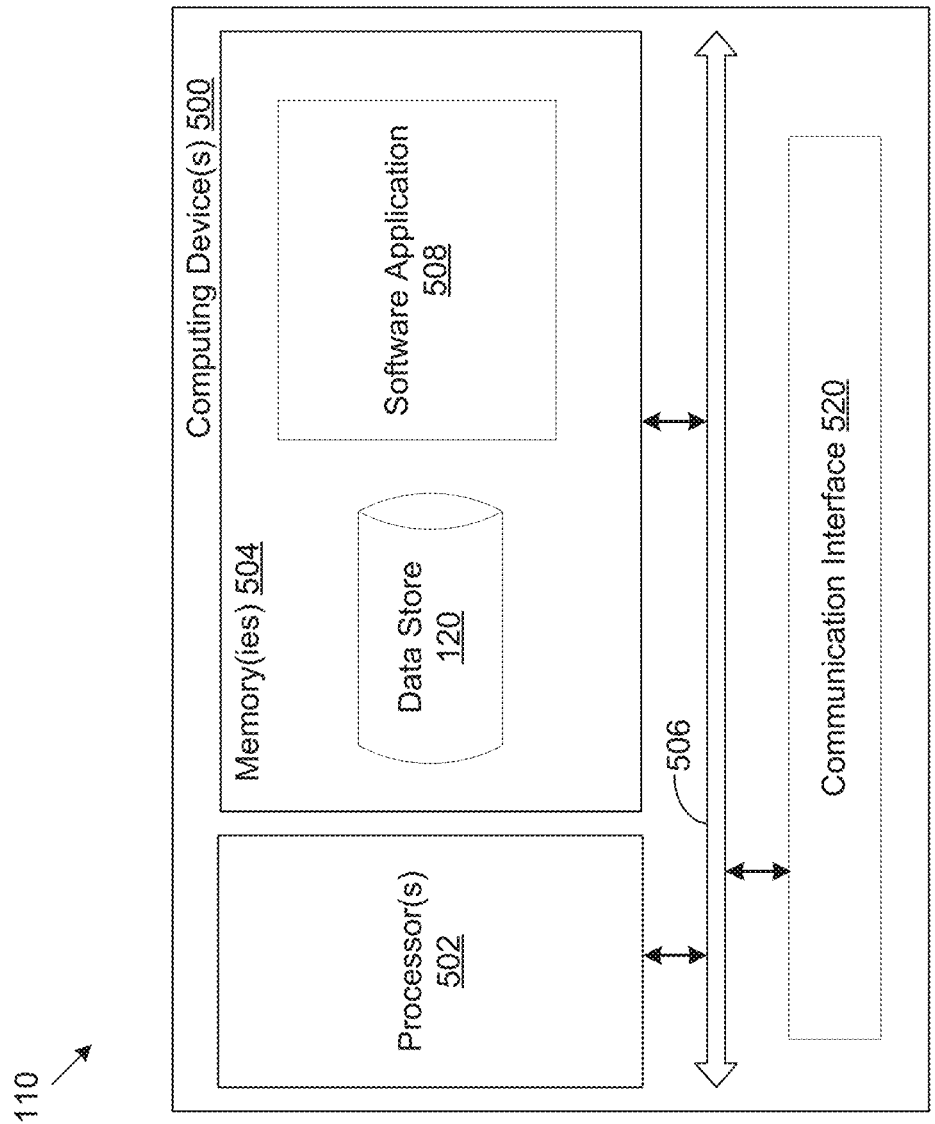
FIG. 5 is a schematic showing an example of an implementation of various embodiments in a computing system.

FIG. 5 is a schematic showing an example of an implementation of various embodiments in a computing system 110. The computing system 110 may include one or more computing devices 500 with distributed hardware and software to implement the functionality of the computing system 110.

The computing device 500 includes at least one processor circuit, for example, having a processor 502 and memory 504, both of which are coupled to a local interface 506 or bus. Stored in the memory 504 are both data and several components that are executable by the processor 502. For example, the memory 504 may include the data store 120 as well as other memory components that store data or executables.

Also stored in the memory 504 and executable by the processor 502 is a software application 508. The software application may implement the method 400 of FIG. 4. The software application 508 may include the chart generator, machine learning module, portal, and other modules.

It is understood that there may be other applications that are stored in the memory 504 and are executable by the processor 502 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 506 may be an appropriate network that facilitates communication between any two of the multiple processors 502, between any processor 502 and any of the memories 504, or between any two of the memories 504, etc. The local interface 506 may couple to additional systems such as the communication interface 520 to coordinate communication with remote systems.

Although components described herein may be embodied in software or code executed by hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowcharts discussed above show the functionality and operation of an implementation of components within a system such as a software application 508 or other software. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 502 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowcharts may also comprise software or code that can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any program or application described herein, including the software application 508, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method for scoring an entity, the method comprising the steps of:
accessing a set of documents, each document being associated with an entity identifier, each document being formatted in a text file format;
generating a set of graphical images by converting each document to a corresponding graphical image having a graphical file format;
inputting the set of graphical images into a neural network; receiving, as a first output of the neural network, a score that is assigned to the set of documents; and receiving, as a second output of the neural network, an output image, the output image being generated by modifying a visual characteristic of a region of at least one of the graphical images among the set of graphical images, wherein the region comprises a hotspot indicating an outlier of a metric represented in the set of documents.

2. The method of claim 1, wherein the set of documents comprises at least one of a balance sheet, an income statement, or a cash flow statement.

3. The method of claim 1, wherein the graphical images are Sankey charts.

4. The method of claim 1, wherein the visual characteristic comprises color intensity or sharpness.

5. The method of claim 1, wherein the neural network comprises a plurality of convolutional layers, each convolutional layer configured according to a training dataset based on the set of documents.

6. The method of claim 1, wherein the neural network is trained using a training dataset, the training dataset comprising a plurality of score labels and a plurality of documents.

7. An apparatus comprising: a processor; and a memory that stores a plurality of instructions, which, when executed by the processor, cause the apparatus to: access a set of documents associated with an entity identifier, each document being formatted in a text file format; convert the set of documents to a set of graphical images having a graphical file format; input the set of graphical images into a trained machine learning module; receive, as a first output of the trained machine learning module, a score that is assigned to the set of documents; and receive, as a second output of the trained machine learning module, an output image, the output image being generated by modifying a visual characteristic of a region of at least one of the graphical images among the set of graphical images, wherein the region comprises a hotspot indicating an outlier of a metric represented in the set of documents.

8. The apparatus of claim 7, wherein the set of graphical images comprise Sankey charts.

9. The apparatus of claim 7, wherein the visual characteristic comprises color intensity or sharpness.

10. The apparatus of claim 7, wherein the trained machine learning module comprises a plurality of convolutional layers, each convolutional layer configured according to a training dataset based on the set of documents.

11. The apparatus of claim 7, wherein the trained machine learning module is trained using a training dataset, the training dataset comprising a plurality of score labels and a plurality of documents.

12. A computer-implemented method for scoring an entity, the method comprising the steps of: accessing a set of documents, each document being associated with an entity identifier, each document being formatted in a text file format; generating a set of graphical images by converting each document to a corresponding graphical image having a graphical file format; inputting the set of graphical images into a neural network, wherein the neural network is trained using a training dataset, the training dataset comprising a plurality of score labels and a plurality of documents; receiving, as a first output of the neural network, a score that is assigned to the set of documents; and receiving, as a second output of the neural network, an output image, the output image being generated by modifying a visual characteristic of a region of at least one of the graphical images among the set of graphical images, wherein the region comprises a hotspot indicating an outlier of a metric represented in the set of documents.

13. The method of claim 12, wherein the set of documents comprises at least one of a balance sheet, an income statement, or a cash flow statement.

14. The method of claim 12, wherein the graphical images are Sankey carts.

15. The method of claim 12, wherein the visual characteristic comprises color intensity or sharpness.

16. The method of claim 12, wherein the neural network comprises a plurality of convolutional layers, each convolutional layer configured according to a training dataset based on the set of documents.

17. An apparatus comprising: a processor; and a memory that stores a plurality of instructions, which, when executed by the processor, cause the apparatus to: access a set of documents associated with an entity identifier, each document being formatted in a text file format; convert the set of documents to a set of graphical images having a graphical file format; input the set of graphical images into a trained machine learning module, wherein the trained machine learning module is trained using a training dataset, the training dataset comprising a plurality of score labels and a plurality of documents; receive, as a first output of the trained machine learning module, a score that is assigned to the set of documents; and receive, as a second output of the trained machine learning module, an output image, the output image being generated by modifying a visual characteristic of a region of at least one of the graphical images among the set of graphical images, wherein the region comprises a hotspot indicating an outlier of a metric represented in the set of documents.

18. The apparatus of claim 17, wherein the set of graphical images comprise Sankey charts.

19. The apparatus of claim 17, wherein the visual characteristic comprises color intensity or sharpness.

20. The apparatus of claim 17, wherein the trained machine learning module comprises a plurality of convolutional layers, each convolutional layer configured according to a training dataset based on the set of documents.

21. The apparatus of claim 17, wherein the trained machine learning module is trained using a training dataset, the training dataset comprising a plurality of score labels and a plurality of documents.

* * * * *